(12) United States Patent
Gosho et al.

(10) Patent No.: US 6,980,904 B2
(45) Date of Patent: Dec. 27, 2005

(54) FAILURE DIAGNOSIS APPARATUS FOR TEMPERATURE SENSOR

(75) Inventors: Eisaku Gosho, Wako (JP); Toshinori Tsukamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/998,054

(22) Filed: Nov. 29, 2004

(65) Prior Publication Data

US 2005/0137780 A1    Jun. 23, 2005

(30) Foreign Application Priority Data

Dec. 22, 2003  (JP) ............................. 2003-424530

(51) Int. Cl.⁷ ............................................. G06F 19/00
(52) U.S. Cl. ..................................... 701/113; 701/114
(58) Field of Search ...................... 701/107, 112, 113, 701/114, 115

(56) References Cited

U.S. PATENT DOCUMENTS

| | | | |
|---|---|---|---|
| 5,617,833 A * | 4/1997 | Tomisawa et al. ..... | 123/568.16 |
| 6,505,464 B1 * | 1/2003 | Isobe et al. .................... | 60/277 |
| 6,601,384 B2 * | 8/2003 | Isobe et al. .................... | 60/285 |
| 6,688,101 B2 * | 2/2004 | Isobe et al. .................... | 60/277 |
| 2002/0056268 A1 * | 5/2002 | Isobe et al. .................... | 60/277 |
| 2002/0056272 A1 * | 5/2002 | Isobe et al. .................... | 60/285 |

FOREIGN PATENT DOCUMENTS

JP        2003-20988        1/2003

* cited by examiner

*Primary Examiner*—John T. Kwon
(74) *Attorney, Agent, or Firm*—Arent Fox PLLC

(57) ABSTRACT

A failure diagnosis apparatus for a temperature sensor which detects a temperature that changes depending on an operating condition of an internal combustion engine. Determining that the temperature sensor fails, if the execution condition of the failure determination is satisfied and a temperature difference between the maximum temperature and the minimum temperature detected by the temperature sensor in the determination period, is less than a failure determination threshold value, when the starting of the engine in the preceding engine operation cycle was a cold start. Alternatively, determining that the temperature sensor fails, if the execution condition is satisfied, the temperature difference between the maximum temperature and the minimum temperature is less than the failure determination threshold value, and an engine stop period in the preceding engine operation cycle is longer than a failure determination permission time period, when the starting of the engine in the preceding engine operation cycle was not a cold start.

10 Claims, 10 Drawing Sheets

FAILURE DIAGNOSIS APPARATUS FOR TEMPERATURE SENSOR

BACKGROUND OF THE INVENTION

1. Field of the Invention

The present invention relates to a failure diagnosis apparatus for a temperature sensor. This temperature sensor detects a temperature that changes depending on an operating condition of an internal combustion engine.

2. Description of the Related Art

A failure-diagnosis apparatus for a temperature sensor, which detects an engine cooling water temperature that changes depending on an operating condition of an internal combustion engine, is shown in Japanese Patent Laid Open No. 2003-20988. According to the apparatus disclosed in Japanese Patent Laid-Open No. 2003-20988, a temperature difference between a stop temperature detected at the end of the preceding engine operation (at the time the engine was stopped) and a start temperature detected at the beginning of the present engine operation is compared with a predetermined determination value. If the temperature difference is less than or equal to the predetermined determination value, it is determined that the temperature sensor fails. This determination is made on condition that a value of an engine operation duration parameter, such as a fuel consumption amount at the end of the preceding engine operation, is greater than or equal to a predetermined value, and an engine stop period immediately before the beginning of the present engine operation is greater than a predetermined time period.

In an example where the engine cooling water temperature TW changes as shown in FIG. 10, a maximum change amount of the cooling water temperature TW is the difference (TW1−TW3) between a cooling water temperature TW1 at time t21 and a cooling water temperature TW3 at time t23 (at the time of starting). However, in the above-mentioned conventional apparatus, a failure determination is performed using a difference (TW2−TW3) between a cooling water temperature TW2 at time t22 (at the time of engine stoppage) and the cooling water temperature TW3 at time t23 (at the time of engine starting). Therefore, the temperature difference (TW2−TW3) is smaller than the temperature difference (TW1−TW3). Consequently, the failure determination accuracy may sometimes become lower.

Further, as to the engine having a block heater, if the atmospheric temperature greatly falls after engine stoppage, the block heater may be turned on and the cooling water temperature may sometimes rise after engine stoppage. Therefore, the cooling water temperature detected at the time of engine starting may become higher than usual, a temperature difference between a cooling water temperature upon engine stoppage and a cooling water temperature upon engine starting may become small, and the failure determination accuracy may become lower.

SUMMARY OF THE INVENTION

It is accordingly an object of the present invention to provide a failure diagnosis apparatus which can accurately perform failure determination of a temperature sensor mounted on an internal combustion engine.

In order to attain the above object, the present invention provides a failure diagnosis apparatus for a temperature sensor 9 which detects a temperature TW that changes depending on an operating condition of an internal combustion engine 1. The failure diagnosis apparatus includes operation duration parameter calculating means, stop period measuring means, maximum temperature storing means, minimum temperature storing means, execution condition determining means, first determining means, and second determining means. The operation duration parameter calculating means calculates an operation duration parameter TOUTINT indicative of a degree of duration of engine operation from a starting time of the engine. The stop period measuring means measures an engine stop period TSTOP from stoppage to next starting of the engine. The maximum temperature storing means stores a maximum temperature TWMAX detected by the temperature sensor 9 during a determination period TPDET containing an engine operating period TOPRN within a preceding engine operation cycle and an after-start period from starting of the engine to the time a predetermined waiting time period TWAIT has elapsed from the starting of the engine within a present engine operation cycle. The minimum temperature storing means stores a minimum temperature TWMIN detected by the temperature sensor 9 during the determination period TPDET. The execution condition determining means determines an execution condition which is satisfied when the operation duration parameter TOUTINT calculated in the preceding engine operation cycle is greater than or equal to a predetermined value TOUTTH. The first determining means determines that the temperature sensor 9 fails, if the execution condition is satisfied and a temperature difference DTWMAX between the maximum temperature TWMAX and the minimum temperature TWMIN is less than a failure determination threshold value DTWTH, when the starting of the engine in the preceding engine operation cycle was a cold start. The second determining means determines that the temperature sensor 9 fails if the execution condition is satisfied, the temperature difference DTWMAX between the maximum temperature TWMAX and the minimum temperature TWMIN is less than the failure determination threshold value DTWTH, and an engine stop period TSTOP in the preceding engine operation cycle is longer than a failure determination permission time period TDPMT when the starting of the engine in the preceding engine operation cycle was not a cold start.

The "engine operation cycle" is defined as one cycle from the time the ignition switch is turned on to the time the ignition switch is next turned on, i.e., one cycle including an engine operating period and an engine stop period.

With this configuration, the maximum temperature and the minimum temperature detected by the temperature sensor during the determination period are stored. The determination period contains an engine operating period within the preceding engine operation cycle and an after-start period from starting of the engine to the time the predetermined waiting time period has elapsed from the starting of the engine within the present engine operation cycle.

When the starting of the engine in the preceding engine operation cycle was a cold start, it is determined that the temperature sensor fails if the execution condition is satisfied, i.e., the operation duration parameter calculated in the preceding engine operation cycle is greater than or equal to a predetermined value, and a temperature difference between the maximum temperature and the minimum temperature is less than the failure determination threshold value.

On the other hand, when the starting of the engine in the preceding engine operation cycle was not a cold start, it is determined that the temperature sensor fails if the execution condition is satisfied, the temperature difference between the maximum temperature and the minimum temperature is less than the failure determination threshold value, and the engine stop period in the preceding engine operation cycle is longer than the failure determination permission time period.

By using the determination period containing the after-start period from starting of the engine to the time the predetermined waiting time period has elapsed from the starting of the engine within the present engine operation cycle, in addition to the preceding engine operating period, determination accuracy can be improved when the atmospheric temperature is so low that the block heater may operate.

Further, by using the maximum temperature and the minimum temperature in the determination period, determination accuracy can be improved when the detected temperature changes like the example shown in FIG. 10. Further, since there may be a case where the temperature detected by the temperature sensor decreases for a short time period after starting of the engine, as shown in FIG. 3 or FIG. 4, determination accuracy can be improved by making the determination period contain the after-start period.

Preferably, the failure diagnosis apparatus has a main microcomputer 21 which is powered when an ignition switch is turned on, and a sub-microcomputer 22 which is always powered. In such apparatus, the sub-microcomputer 22 may constitute the stop time period measuring means.

With this configuration, the measurement of the engine stop period is performed by the sub-microcomputer. Accordingly, accuracy of the time-period measurement can be improved. Further, since it is not necessary to always supply power to the main microcomputer, power consumption can be reduced.

Preferably, the operation duration parameter TOUTINT is an integrated value of an amount TOUT of fuel supplied to the engine. Further, in one embodiment of the present invention, the temperature sensor 9 is a cooling water temperature sensor for detecting a cooling water temperature of the engine.

DETAILED DESCRIPTION OF THE PREFERRED EMBODIMENTS

Preferred embodiments of the present invention will now be described with reference to the drawings.

Figure 1:
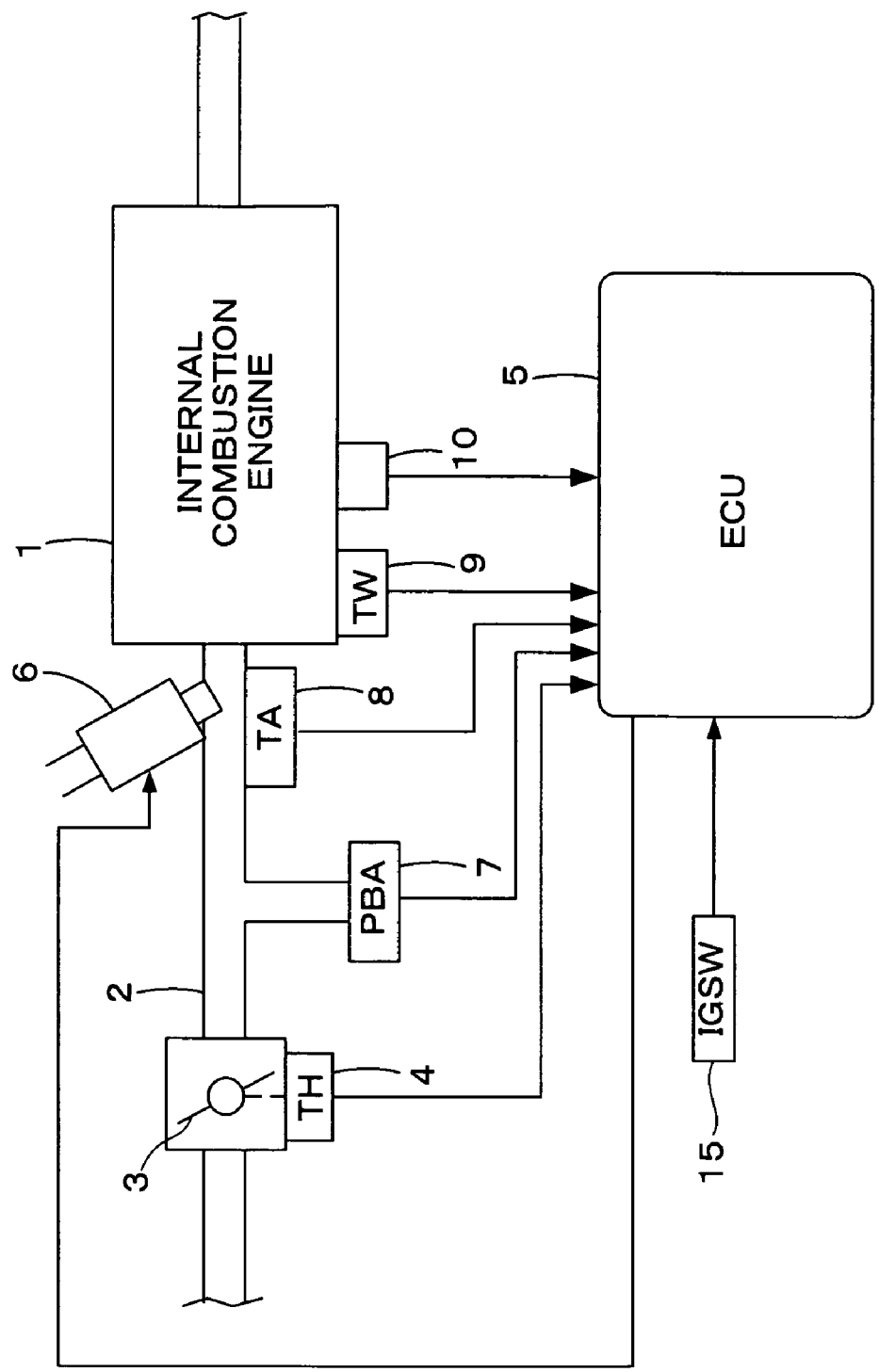
FIG. 1 is a schematic diagram showing an exemplary configuration of a control system for an internal combustion engine, including a temperature sensor and a failure diagnosis apparatus therefor, according to one embodiment of the present invention.

FIG. 1 schematically shows a general configuration of an internal combustion engine (which will be hereinafter referred to as "engine") and a control system therefor, according to an embodiment of the present invention. The engine has an intake pipe 2 provided with a throttle valve 3. A throttle valve opening sensor 4 is connected to the throttle valve 3, so as to output an electrical signal corresponding to an opening TH of the throttle valve 3 and supply the electrical signal to an electronic control unit 5 (which will be hereinafter referred to as "ECU").

A fuel injection valve 6 is provided for each cylinder so as to inject fuel into the intake pipe 2. The fuel injection valves 6 are connected to a fuel pump (not shown) and electrically connected to the ECU 5. A valve opening period of each fuel injection valve 6 is controlled by a signal output from the ECU 5.

An absolute intake pressure PBA sensor 7 is provided immediately downstream of the throttle valve 3. An absolute pressure signal converted to an electrical signal by the absolute intake pressure sensor 7 is supplied to the ECU 5. An intake air temperature TA sensor 8 is provided downstream of the absolute intake pressure sensor 7 to detect an intake air temperature TA. An electrical signal corresponding to the detected intake air temperature TA is output from the sensor 8 and supplied to the ECU 5.

An engine cooling water temperature TW sensor 9, such as a thermistor, is mounted on the body of the engine 1 to detect an engine cooling water temperature TW. A temperature signal corresponding to the detected engine cooling water temperature TW is output from the sensor 9 and supplied to the ECU 5.

A crank angle position sensor 10 for detecting a rotational angle of a crankshaft (not shown) of the engine 1 is connected to the ECU 5, and a signal corresponding to the detected rotational angle of the crankshaft is supplied to the ECU 5. The crank angle position sensor 10 consists of a cylinder discrimination sensor, a TDC sensor, and a CRK sensor. The cylinder discrimination sensor outputs a pulse at a predetermined crank angle position for a specific cylinder of the engine 1. This pulse will be hereinafter referred to as "CYL pulse". The TDC sensor outputs a TDC pulse at a crank angle position before a top dead center (TDC) by a predetermined crank angle starting at an intake stroke in each cylinder (at every 180-degree crank angle in the case of a four-cylinder engine). The CRK sensor generates one pulse with a constant crank angle period (e.g., a period of 30 degrees) shorter than the period of generation of the TDC pulse. This pulse will be hereinafter referred to as "CRK pulse". The CYL pulse, the TDC pulse, and the CRK pulse are supplied to the ECU 5. These pulses are used to control the various timings, such as fuel injection timing and ignition timing, and for detection of an engine rotational speed NE.

An ignition switch 15 is connected to the ECU 5, and a switching signal of the ignition switch 15 is supplied to the ECU 5.

The ECU 5 includes an input circuit, a main microcomputer, a sub-microcomputer, a memory circuit, and an output circuit. The input circuit has various functions including a function of shaping waveforms of input signals from the various sensors, a function of correcting the voltage levels of the input signals to a predetermined level, and a function of converting analog signal values into digital signal values. The main microcomputer is supplied with power (turned on) when the engine 1 is operating (when the ignition switch is on). The sub-microcomputer is always supplied with power even when the engine 1 is stopped (when the ignition switch is off). The memory circuit preliminarily stores various operational programs to be executed by the main microcomputer and stores the results of computation, or the like, made by the main microcomputer. The output circuit supplies drive signals to the fuel injection valves 6. The ECU 5 controls an opening period TOUT of the injection valves 6 based on the detection signals from the various sensors. Further, the ECU 5 performs failure diagnosis of the engine cooling water temperature sensor 9.

Figure 2:
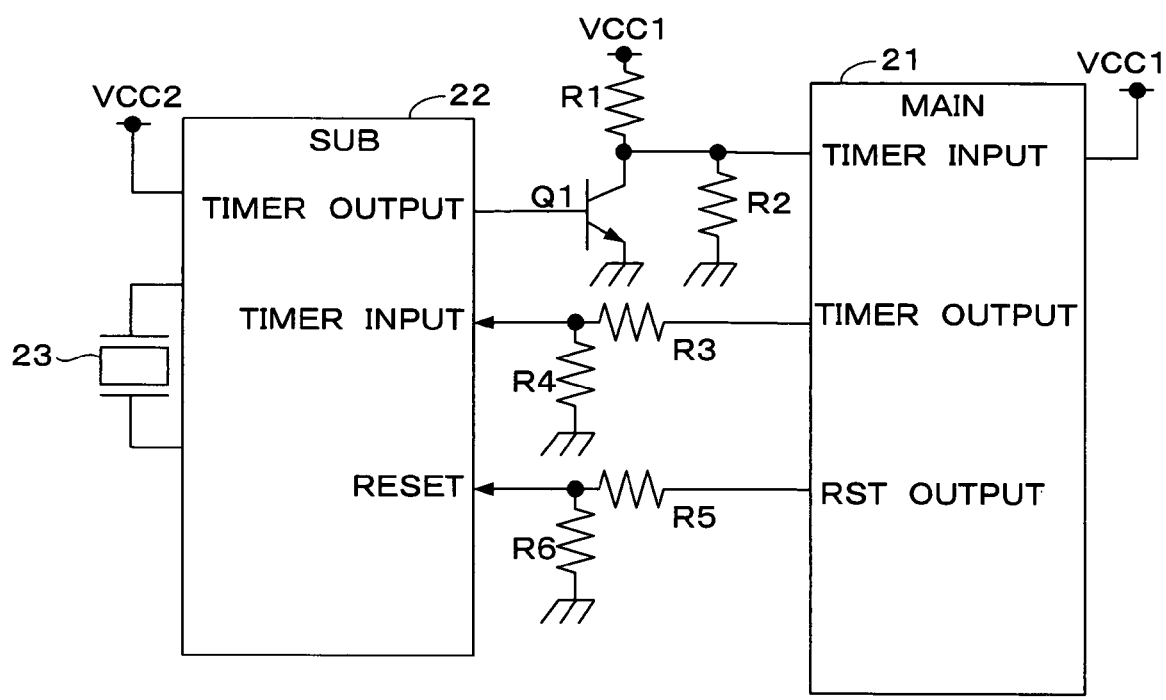
FIG. 2 is a schematic diagram showing exemplary connections between a main microcomputer and a sub-microcomputer.

FIG. 2 shows connection between the main microcomputer 21 of ECU 5 and the sub-microcomputer 22. The crystal oscillator 23, for generating a clock signal, is connected to the sub-microcomputer 22. A time period measurement is performed using the clock signal generated by the oscillating circuit including this crystal oscillator 23.

A timer output of the sub-microcomputer 22 is connected to a timer input of the main microcomputer 21 through a transistor Q1 and resistors R1 and R2. Further, a timer output of the main microcomputer 21 is connected to a timer input of the sub-microcomputer 22 through resistors R3 and R4. An RST output of the main microcomputer 21 is connected to a reset input of the sub-microcomputer 22 through resistors R5 and R6. A power source VCC1, which supplies power when the ignition switch is turned on, is connected to the main microcomputer 21. A power source VCC2, which always supplies power, is connected to the sub-microcomputer 22.

In this embodiment, the sub-microcomputer 22 measures a stop period TSTOP of the engine 1. That is, when the ignition switch is turned off, the main microcomputer 21 outputs a reset signal RST from the RST output, and resets the sub-microcomputer 22. This makes the sub-microcomputer 22 start the time period measurement by the timer.

Next, when the ignition switch is turned on, the main microcomputer 21 reads in the stop period TSTOP of the engine 1 according to the present timer output of the sub-microcomputer 22. The main microcomputer 21 performs failure detection of the sub-microcomputer 22 during the operation by periodically reading the timer output of the sub-microcomputer 22 and comparing the read timer output with a time period measured by a timer included in the main microcomputer 21. Accuracy of the timer of the sub-microcomputer 22 is sufficient for correctly measuring the engine stop period TSTOP, and correction of the measured time period is unnecessary.

The failure determination method for the engine cooling water temperature sensor 9 in this embodiment will be described with reference to FIGS. 3 and 4. If an engine operation cycle, including the time of performing a failure determination, is defined as a present engine operation cycle, FIG. 3 shows an example where the starting of the engine 1 in the preceding engine operation cycle was a cold start, and FIG. 4 shows an example where the starting of the engine 1 in the preceding engine operation cycle was not a cold start, i.e., a hot start.

Figure 3:
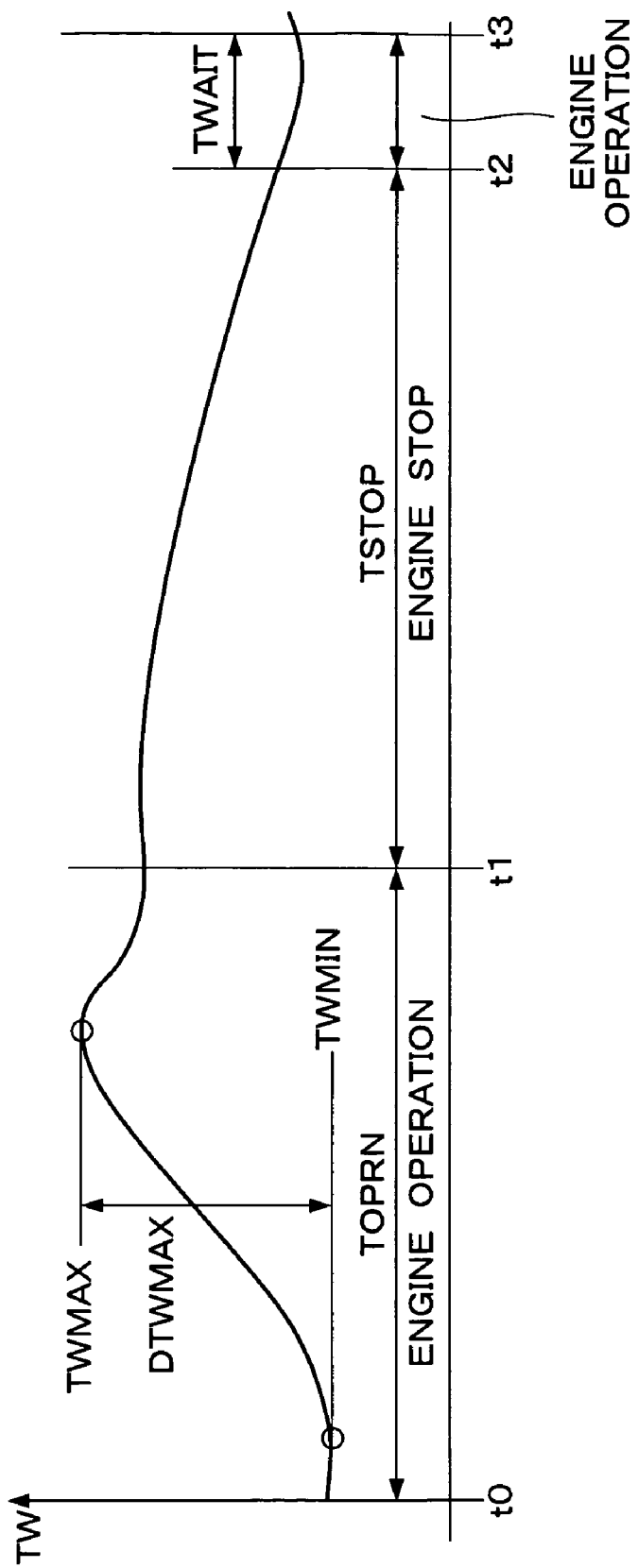
FIGS. 3 and 4 are time charts for illustrating a failure determination method of a temperature sensor.
Figure 4:
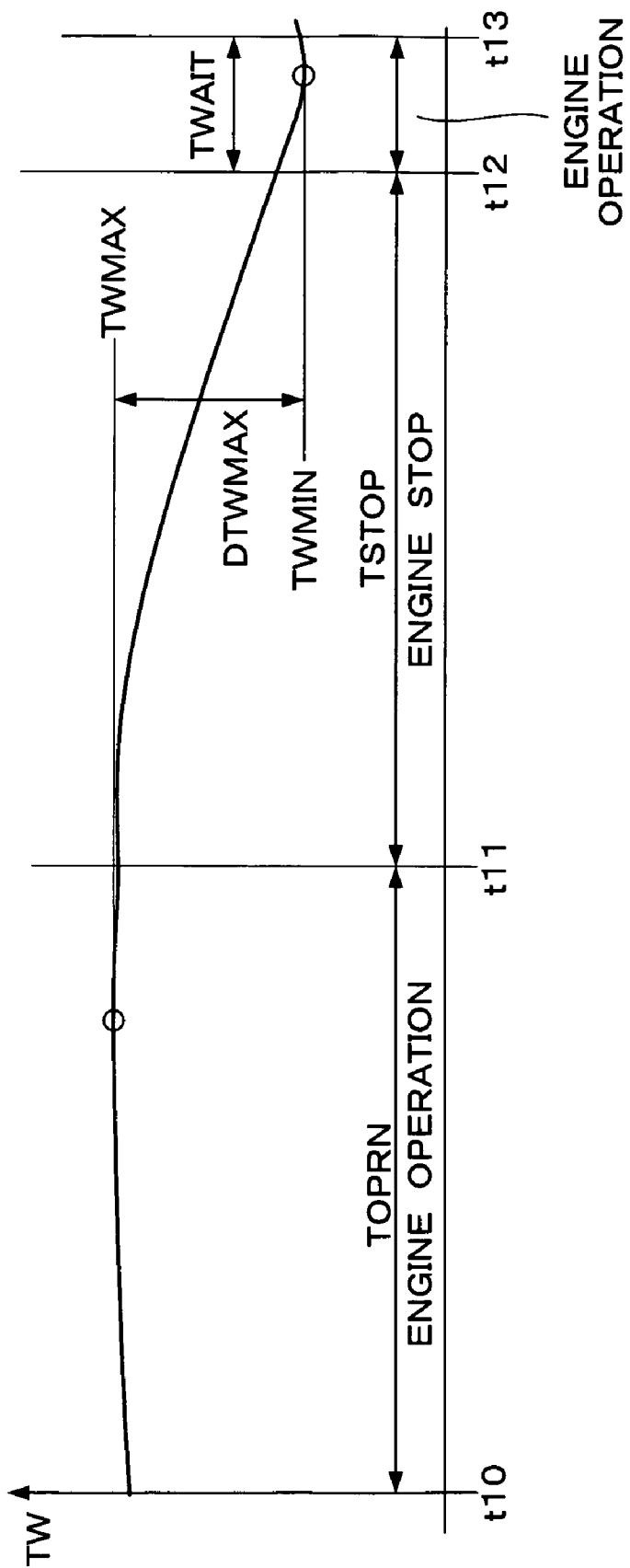

In this embodiment, the determination period TPDET is defined as a time period obtained by combining the engine operating period TOPRN in the preceding engine operation cycle (FIG. 3: time t0–time t1, FIG. 4: time t10–time t11) with TWAIT from the current engine operation cycle (FIG. 3: time t2–time t3, FIG. 4: time t12–t13). Typically, TWAIT is a predetermined waiting time period (for example, 10 seconds) that is measured from the starting time in the present engine operation cycle. When a temperature difference DTWMAX between the maximum temperature TWMAX and the minimum temperature TWMIN detected by the engine cooling water temperature sensor 9 within the above-defined determination period TPDET is less than a failure determination threshold value DTWTH (for example, 10 degrees Centigrade), it is determined that the engine cooling water temperature sensor 9 failed.

It should be noted that when the engine starting in the preceding engine operation cycle was a cold start, like the example shown in FIG. 3, the failure of the engine cooling water temperature sensor 9 is determined irrespective of the engine stop period TSTOP in the preceding engine operation cycle. Further, when the engine starting in the preceding engine operation cycle was a hot start, like the example shown in FIG. 4, the failure of the engine cooling water temperature sensor 9 is determined when the engine stop period TSTOP in the preceding engine operation cycle is longer than a failure determination permission time period TDPMT (for example, 120 minutes).

Furthermore, in any of the examples shown in FIG. 3 and FIG. 4, it is an execution condition of the failure determination that the fuel consumption during the engine operation in the preceding engine operation cycle is greater than or equal to a predetermined quantity. That is, when the fuel consumption during the engine operation in the preceding engine operation cycle is less than the predetermined quantity, the determination, whether the engine cooling water temperature sensor 9 is normal or fails, is not performed.

Figure 5:
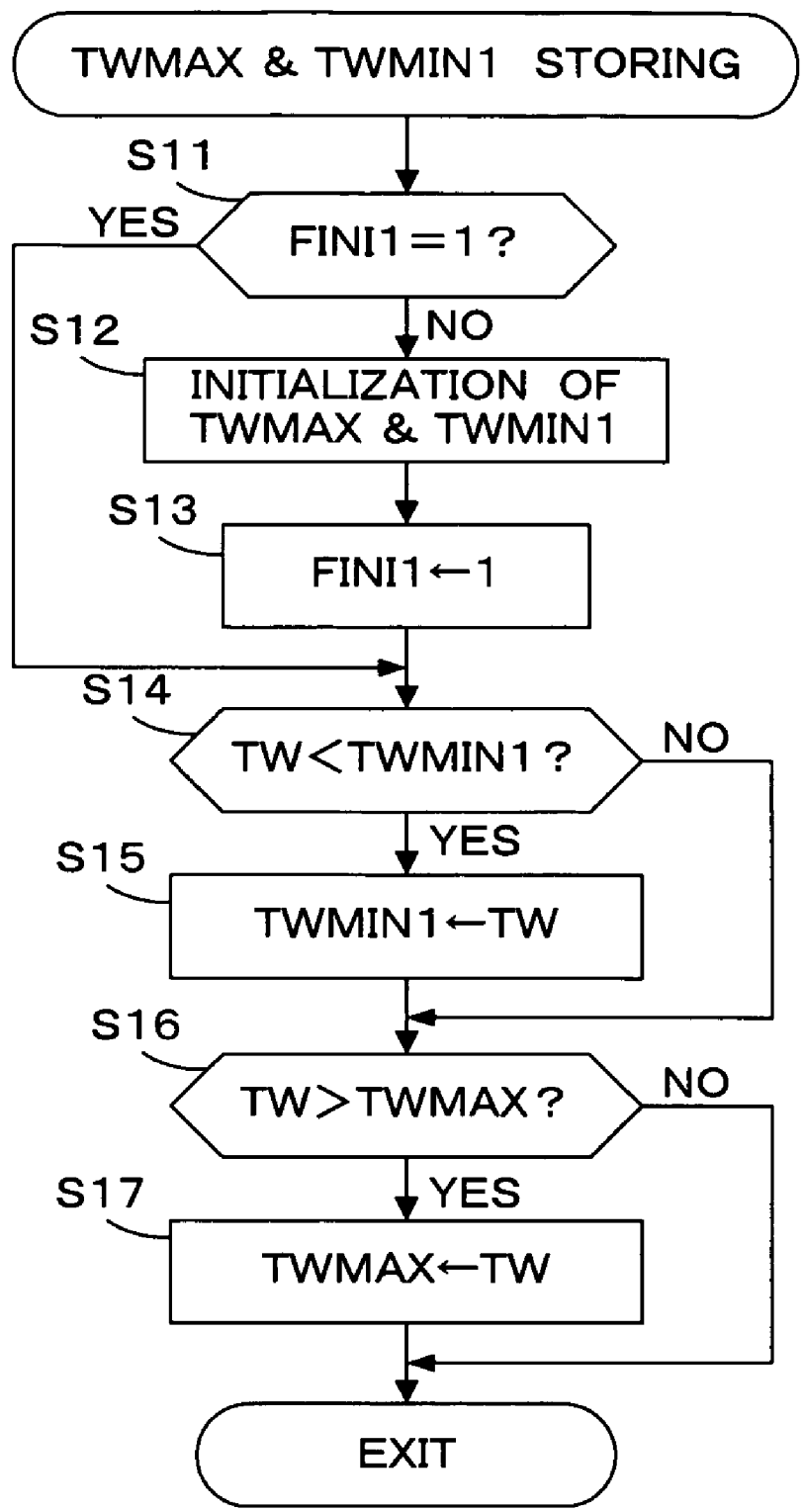
FIG. 5 is a flowchart showing a process for storing a maximum temperature and a minimum temperature during engine operation.

FIG. 5 is a flowchart showing a process for storing the maximum temperature TWMAX and the first minimum temperature TWMIN1 during the engine operation in the preceding engine operation cycle. This process is executed at predetermined time intervals (for example, 200 milliseconds) by the main microcomputer 21 of the ECU 5.

In step S11, it is determined whether or not a first initialization flag FINI1 is "1". Since FINI1 is equal to "0" immediately after the ignition switch is turned on, the process proceeds to step S12, in which the maximum temperature TWMAX and the first minimum temperature TWMIN1 are initialized. Specifically, both the maximum temperature TWMAX and the first minimum temperature TWMIN1 are set, for example, to the present engine cooling water temperature (sensor output) TW. In step S13, the first initialization flag FINI1 is set to "1". Since the answer to step S11 becomes affirmative (YES) after execution of step S13, the process proceeds to step S14 directly from step S11.

In step S14, it is determined whether or not the engine cooling water temperature TW is lower than the first minimum temperature TWMIN1. If the answer to this step is negative (NO), the process immediately proceeds to step S16. If the engine cooling water temperature TW is lower than the first minimum temperature TWMIN1, the first minimum temperature TWMIN1 is updated to the engine cooling water temperature TW (step S15).

In step S16, it is determined whether or not the engine cooling water temperature TW is higher than the maximum temperature TWMAX, and when the answer to step S16 is negative (NO), this process immediately ends. If the engine cooling water temperature TW is higher than the maximum temperature TWMAX, the maximum temperature TWMAX is updated to the engine cooling water temperature TW (step S17).

Figure 6:
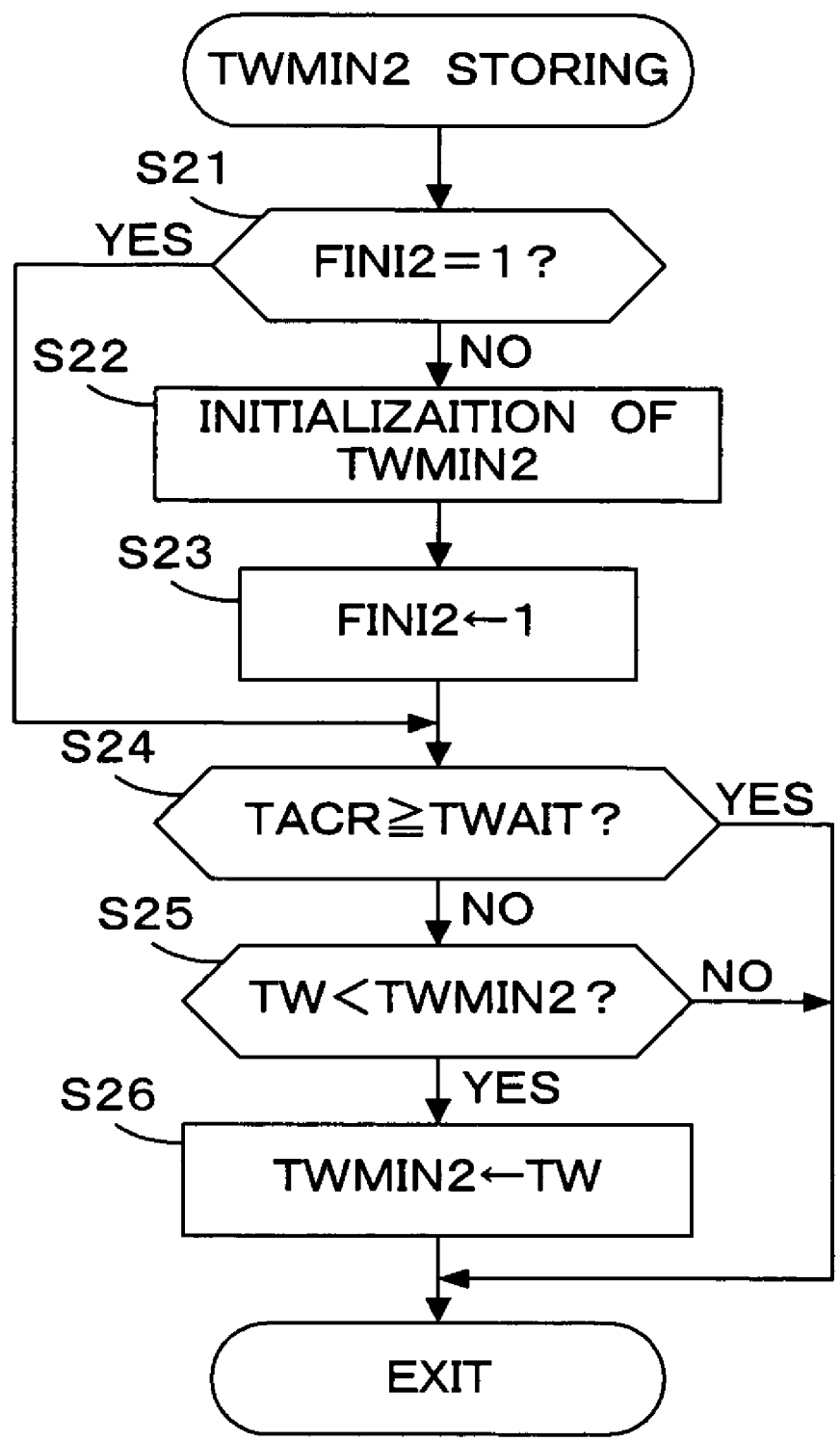
FIG. 6 is a flowchart showing a process for storing a minimum temperature during a predetermined waiting time period from starting of the engine.

FIG. 6 is a flowchart showing a process for storing the minimum temperature (second minimum temperature) TWMIN2 during an after-start period from the engine starting to the time a predetermined waiting time period TWAIT has elapsed from the engine starting in the present engine operation cycle. This process is executed at predetermined time intervals (for example, 200 milliseconds) by the main microcomputer 21 of the ECU 5.

In step S21, it is determined whether or not a second initialization flag FINI2 is "1". Since FINI2 is equal to "0" immediately after the ignition switch is turned on, the process proceeds to step S22, in which the second minimum temperature TWMIN2 is initialized. Specifically, the second minimum temperature TWMIN2 is set, for example, to the present engine cooling water temperature TW. In step S23, the second initialization flag FINI2 is set to "1". Since the answer to step S21 becomes affirmative (YES) after execution of step S23, the process proceeds to step S24 directly from step S21.

In step S24, it is determined whether or not an elapsed time period TACR after starting of engine 1 (after-start elapsed time period) is greater than or equal to the predetermined waiting time period TWAIT. Since the answer to step S24 is negative (NO) at first, the process proceeds to step S25, in which it is determined whether or not the engine cooling water temperature TW is lower than the second minimum temperature TWMIN2. If the answer to step S25 is negative (NO), this process immediately ends. If the engine cooling water temperature TW is lower than the second minimum temperature TWMIN2, the second minimum temperature TWMIN2 is updated to the engine cooling water temperature TW (step S26).

The maximum temperature TWMAX is not updated during the after-start period. Accordingly, only the second minimum temperature TWMIN2 is stored in this process.

Figure 7:
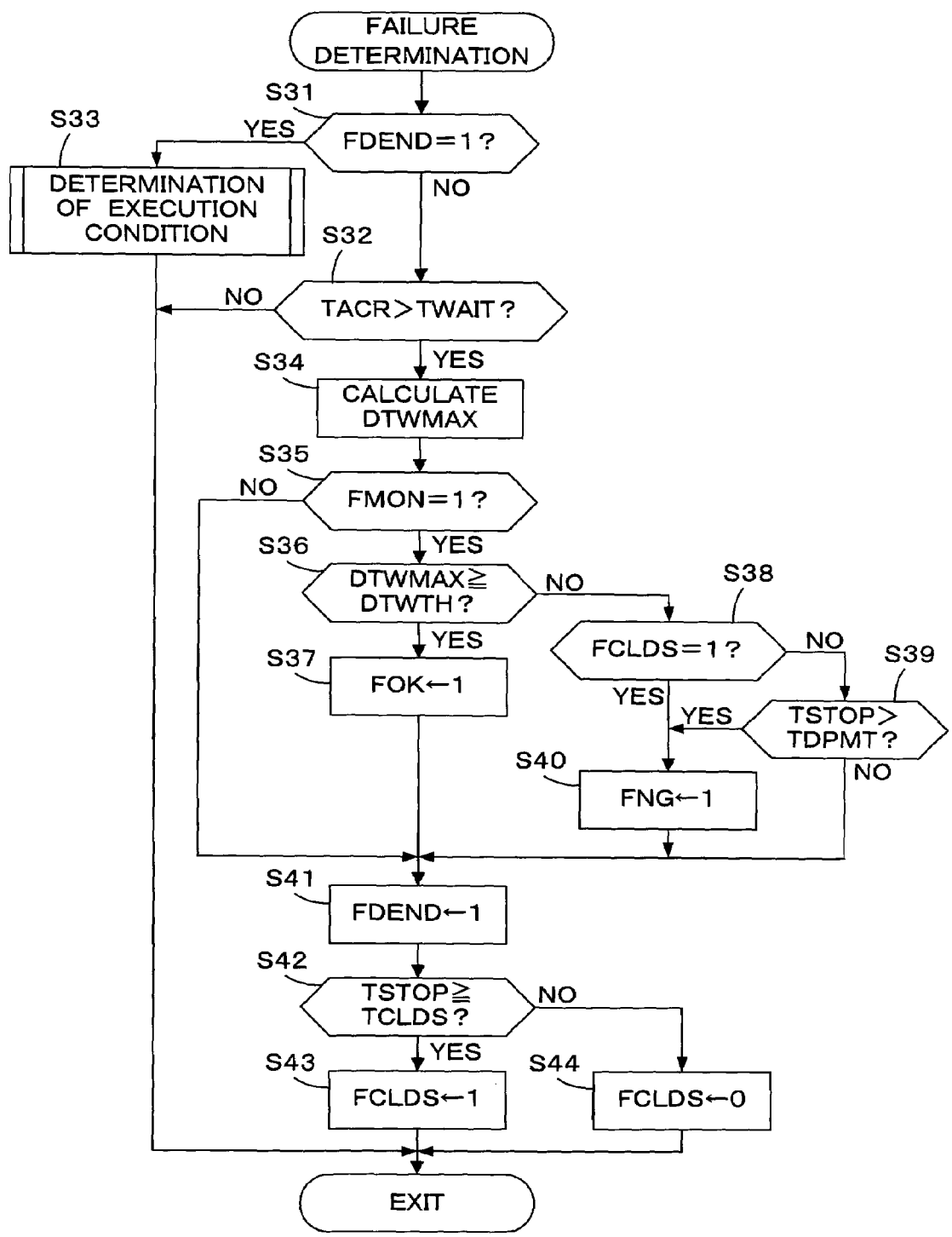
FIG. 7 is a flowchart showing a process for failure determination of an engine cooling water temperature sensor.

FIG. 7 is a flowchart showing a process for performing a failure determination of the engine cooling water temperature sensor 9. This process is executed at predetermined time intervals (for example, 200 milliseconds) by the main microcomputer 21 of the ECU 5.

In step S31, it is determined whether or not a determination end flag FDEND is "1". Since FDEND is equal to "0" at first, the process proceeds to step S32, in which it is determined whether or not the after-start elapsed time period TACR has exceeded the predetermined waiting time period TWAIT. Since the answer to step S32 is negative (NO) at first, this process immediately ends.

Figure 8:
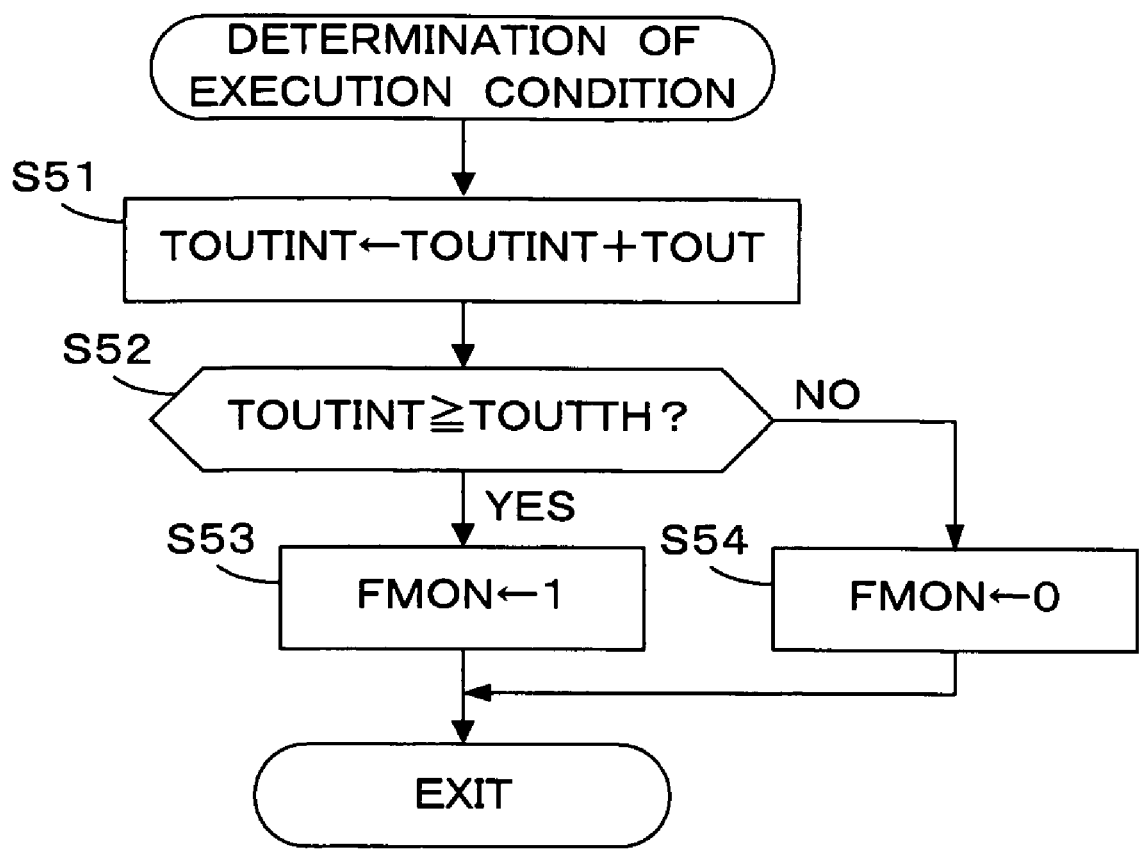
FIG. 8 is a flowchart showing an execution condition determination process executed in the process of FIG. 7.

After the determination end flag FDEND is set to "1" in step S41 described below, the process proceeds to step S33, in which an execution condition determination process is executed. Specifically, as shown in FIG. 8, an integrated fuel injection period TOUTINT, which is proportional to the fuel consumption amount during engine operation, is calculated in step S51 by integrating the valve opening period (fuel injection period) TOUT (fuel supply amount per 1 TDC period) of the fuel injection valve 6. Further, it is determined whether or not the integrated fuel injection period TOUTINT is greater than or equal to a predetermined threshold value TOUTTH (step S52).

IF the answer to step S52 is affirmative (YES), an execution condition flag FMON is set to "1" (step S53). If the answer to step S52 is negative (NO), the execution condition flag FMON is set to "0" (step S54). The value of the execution condition flag FMON is maintained even when the ignition switch is turned off. The integrated fuel injection period TOUTINT is returned to "0", when the ignition switch is turned off.

Returning to FIG. 7, when the predetermined waiting time period TWAIT has elapsed from the starting of the engine 1, the process proceeds from step S32 to step S34, in which a maximum temperature difference DTWMAX is calculated. Specifically, a minimum temperature TWMIN is first calculated with the following equation (1) by selecting a lower one of the first minimum temperature TWMIN1 and the second minimum temperature TWMIN2. Next the maximum temperature difference DTWMAX is calculated as a difference between the maximum temperature TWMAX and the minimum temperature TWMIN with the following equation (2).

$$TWMIN=MIN(TWMIN1, TWMIN2) \quad (1)$$

$$DTWMAX=TWMAX-TWMIN \quad (2)$$

In step S35, it is determined whether or not the execution condition flag FMON set in the preceding engine operation cycle is "1".

If FMON is equal to "0" in step S35, i.e., the execution condition is not satisfied, the process immediately proceeds to step S41. If FMON is equal to "1", i.e., the execution condition is satisfied, it is determined whether or not the maximum temperature difference DTWMAX calculated in step S34 is greater than or equal to a failure determination threshold value DTWTH (step S36). If the answer to step S36 is affirmative (YES), the engine cooling water temperature sensor 9 is determined to be normal, and a normal flag FOK is set to "1" (step S37).

If DTWMAX is less than DTWTH in step S36, it is determined whether or not a cold start flag FCLDS is "1". The cold start flag FCLDS, which is updated in step S43 or step S44 described below, is set to "1" when a cold start condition is satisfied.

If FCLDS is equal to "1" in step S38, i.e., the engine starting in the preceding engine operation cycle was a cold start, it is determined that the engine cooling water temperature sensor 9 failed, and a failure flag FNG is set to "1" (step S40). When the failure flag FNG is set to "1", a warning lamp, for example, is turned on in order to warn the driver.

If FCLDS is equal to "0", i.e., the starting in the preceding engine operation cycle was not a cold start, it is further determined whether or not the engine stop period TSTOP in the preceding engine operation cycle is longer than a failure determination permission time period TDPMT (step S39). If TSTOP is longer than TDPMT, it is determined that the engine cooling water temperature sensor 9 failed, and the process proceeds to step S40. On the other hand, if the engine stop period TSTOP is shorter than or equal to the failure determination permission time period TDPMT, the process immediately proceeds to step S41, since it may not necessarily be determined that the engine cooling water temperature sensor 9 failed.

In step S41, the determination end flag FDEND is set to "1". Next, it is determined whether or not the engine stop period TSTOP in the preceding engine operation cycle is longer than a cold start determination time period TCLDS (for example, 6 hours) (step S42). If TSTOP is longer than or equal to TCLDS, it determined that the engine starting in the present engine operation cycle was a cold start, and the cold start flag FCLDS is set to "1" (step S43). On the other hand, if TSTOP is shorter than TCLDS, it is determined that the engine starting in the present engine operation cycle was not a cold start, and the cold starting flag FCLDS is set to "0" (step S44). The value of the cold start flag FCLDS is maintained even when the ignition switch is turned off, and the cold start flag FCLDS is referred to in step S38 upon execution of this process in the following engine operation cycle.

When this process is started after execution of step S41, the answer to step S31 becomes affirmative (YES). Accordingly, steps S32 to S44 are not executed. That is, steps S32 to S44 are executed once, when the predetermined waiting time period TWAIT has elapsed from the starting of the engine 1.

As described above, according to the process of FIG. 7, when the engine starting in the preceding engine operation cycle was a cold start (FCLDS= 1), it is determined that the engine cooling water temperature sensor 9 failed if the determination execution condition is satisfied (FMON=1) and the maximum temperature difference DTWMAX, which is a temperature difference between the maximum temperature TWMAX and the minimum temperature TWMIN within the determination period TPDET, is less than the failure determination threshold value DTWTH.

Further, when the engine starting in the preceding engine operation cycle was not a cold start, it is determined that the engine cooling water temperature sensor 9 failed if the engine stop period TSTOP in the preceding engine operation cycle is longer than the failure determination permission time period TDPMT, in addition to the condition where the execution condition is satisfied (FMON=1), and the temperature difference DTWMAX between the maximum temperature TWMAX and the minimum temperature TWMIN is less than the failure determination threshold value DTWTH.

Figure 10:
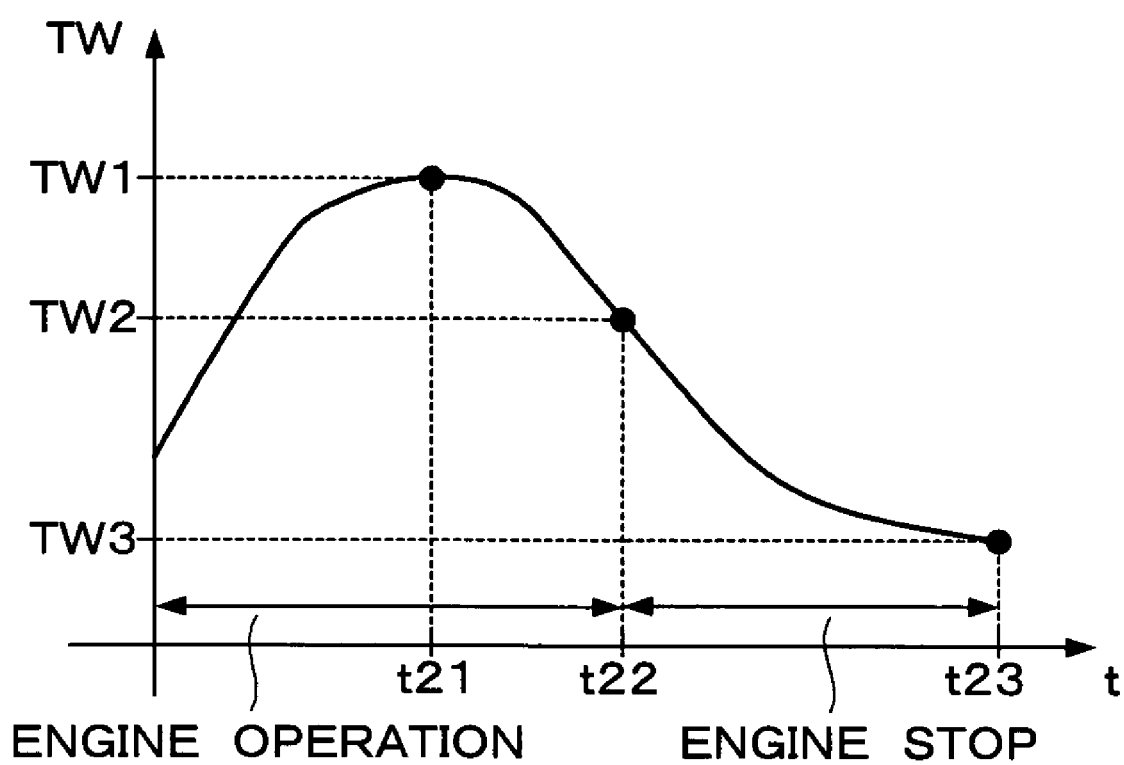
FIG. 10 is a time chart for illustrating a problem of the prior art.

Since the determination period TPDET contains the after-start period from the engine starting in the present engine operation cycle to the time the predetermined waiting time period TWAIT has elapsed from the engine starting, determination accuracy can be improved when the atmospheric temperature is so low that the block heater may operate. Further, by using the maximum temperature and the minimum temperature in the determination period TPDET, determination accuracy can be improved when the detected temperature changes like the example shown in FIG. 10. Further, there may be a case where the temperature detected by the engine cooling water temperature sensor 9 decreases for a short time period after starting of the engine, as shown in FIG. 3 or FIG. 4. Therefore, by making the determination period TPDET contain the after-start period, determination accuracy can be improved.

In this embodiment, the main microcomputer 21 of the ECU 5 constitutes operation duration parameter calculating means, maximum temperature storing means, minimum temperature storing means, execution condition determining means, first determining means, and second determining means. Further, the sub-microcomputer 22 constitutes stop period measuring means. Specifically, in this embodiment, the integrated fuel injection period TOUTINT corresponds to the operation duration parameter, and step S51 of FIG. 8 corresponds to the operation duration parameter calculating means. Further, the processes shown in FIGS. 5 and 6 correspond to the maximum temperature storing means and the minimum temperature storing means. Step S33 of FIG. 7 corresponds to the execution condition determining means, and steps S34–S36, and S38–S40 of FIG. 7 correspond to the first determining means and the second determining means.

The present invention is not limited to the embodiment described above, and various modifications may be made. For example, in the above-described embodiment, the determination period TPDET is defined as a period consisting of an engine operating period in the preceding engine operation cycle and the after-start period from starting of the engine to the time the predetermined waiting time period has elapsed from the starting of the engine in the present engine operation cycle. Alternatively, the determination period TPDET may include the engine stop period in the preceding engine operation cycle. That is, the maximum temperature TWMAX and the minimum temperature TWMIN may be updated in the engine stop period in the preceding engine operation cycle. In such modification, the sub-microcomputer 22 executes a process shown in FIG. 9 instead of the process shown in FIG. 5, and transmits the stored maximum temperature TWMAN and the stored first minimum temperature TWMIN1 to the main microcomputer 21.

Figure 9:
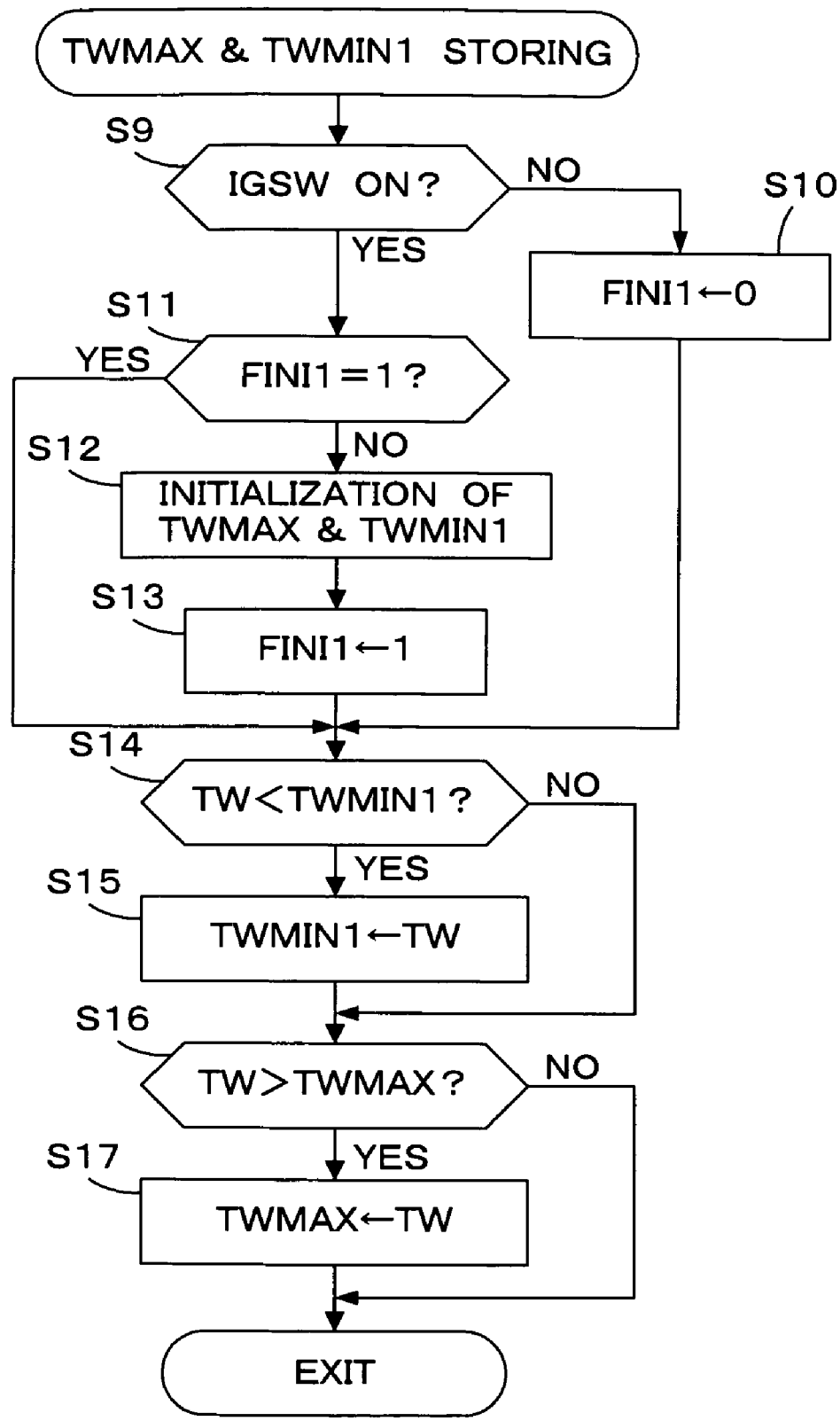
FIG. 9 is a flowchart showing a modification of the process of FIG. 5.

The process of FIG. 9 is obtained by adding step S9 and step S10 to the process of FIG. 5, and this process is always executed at every predetermined time interval irrespective of on/off state of the ignition switch. In step S9, it is determined whether or not the ignition switch is turned on. If the ignition switch is off, a first initialization flag FINI1 is set to "0" (step S10), and the process proceeds to step S14. If the ignition switch is on, the process proceeds to step S11.

Further, the operation duration parameter may not be restricted to the integrated fuel injection period TOUTINT. Alternatively, mileage of the vehicles driven by the engine 1, or an operating time period of the engine 1, may be used as the operation duration parameter.

Further, in the above-described embodiment, starting of the engine is determined to be a cold start when the engine stop period TSTOP is longer than the cold start determination time period TCLDS. Alternatively, for example, when both the engine cooling water temperature TW and the intake air temperature TA are lower than or equal to a predetermined temperature (for example, 35 degrees Centigrade) and a difference (TW−TA) between the engine cooling water temperature TW and the intake air temperature TA is less than or equal to a predetermined temperature difference (for example, 6 degrees Centigrade), starting of the engine may be determined to be a cold start. Further alternatively, when an absolute value of the difference between the engine cooling water temperature TW and the intake air temperature TA is less than or equal to a predetermined temperature difference and the engine stop period TSTOP is longer than or equal to the cold start determination time period TCLDS, starting of the engine may be determined to be a cold start.

Further, the temperature sensor as an object of the failure diagnosis may not be restricted to the engine cooling water temperature sensor. The present invention can be applied to failure diagnosis of other temperature sensors for detecting a temperature which changes depending on an engine operating condition, such as a lubricating oil temperature sensor for detecting a temperature of lubricating oil of the engine.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A failure diagnosis apparatus for a temperature sensor which detects a temperature that changes depending on an operating condition of an internal combustion engine, said failure diagnosis apparatus comprising:
   operation duration parameter calculating means for calculating an operation duration parameter indicative of a duration of engine operation from a starting time to a stopping time of said engine;
   stop period measuring means for measuring an engine stop period from said stopping time to a next starting of said engine;
   maximum temperature storing means for storing a maximum temperature detected by said temperature sensor during a determination period containing an engine operating period within a preceding engine operation cycle and an after-start period from starting of said engine to the time a predetermined waiting time period has elapsed from the starting of said engine within a present engine operation cycle;

minimum temperature storing means for storing a minimum temperature detected by said temperature sensor during the determination period;

execution condition determining means for determining an execution condition which is satisfied when the operation duration parameter calculated in the preceding engine operation cycle is greater than or equal to a predetermined value;

first determining means for determining that said temperature sensor fails, if the execution condition is satisfied and a temperature difference between the maximum temperature and the minimum temperature is less than a failure determination threshold value, when the starting of said engine in the preceding engine operation cycle was a cold start; and second determining means for determining that said temperature sensor fails, if the execution condition is satisfied, the temperature difference between the maximum temperature and the minimum temperature is less than the failure determination threshold value, and an engine stop period in the preceding engine operation cycle is longer than a failure determination permission time period, when the starting of said engine in the preceding engine operation cycle was not a cold start.

2. A failure diagnosis apparatus according to claim 1, having a main microcomputer which is powered when an ignition switch is turned on, and a sub-microcomputer which is always powered, wherein said sub-microcomputer constitutes said stop time period measuring means.

3. A failure diagnosis apparatus according to claim 1, wherein the operation duration parameter is an integrated value of an amount of fuel supplied to said engine.

4. A failure diagnosis apparatus according to claim 1, wherein said temperature sensor is a cooling water temperature sensor for detecting a cooling water temperature of said engine.

5. A failure diagnosis method for a temperature sensor which detects a temperature that changes depending on an operating condition of an internal combustion engine, said failure diagnosis method comprising the steps of:

a) calculating an operation duration parameter indicative of a duration of engine operation from a starting time to a stopping time of said engine;

b) measuring an engine stop period from said stopping time to a next starting of said engine;

c) storing a maximum temperature detected by said temperature sensor during a determination period containing an engine operating period within a preceding engine operation cycle and an after-start period from starting of said engine to the time a predetermined waiting time period has elapsed from the starting of said engine within a present engine operation cycle;

d) storing a minimum temperature detected by said temperature sensor during the determination period;

e) determining an execution condition which is satisfied when the operation duration parameter calculated in the preceding engine operation cycle is greater than or equal to a predetermined value;

f) determining that said temperature sensor fails, if the execution condition is satisfied and a temperature difference between the maximum temperature and the minimum temperature is less than a failure determination threshold value, when the starting of said engine in the preceding engine operation cycle was a cold start; and g) determining that said temperature sensor fails, if the execution condition is satisfied, the temperature difference between the maximum temperature and the minimum temperature is less than the failure determination threshold value, and an engine stop period in the preceding engine operation cycle is longer than a failure determination permission time period, when the starting of said engine in the preceding engine operation cycle was not a cold start.

6. A failure diagnosis method according to claim 5, wherein the operation duration parameter is an integrated value of an amount of fuel supplied to said engine.

7. A failure diagnosis method according to claim 5, wherein said temperature sensor is a cooling water temperature sensor for detecting a cooling water temperature of said engine.

8. A computer program embodied on a computer-readable medium, for causing a computer to carry out a failure diagnosis method for a temperature sensor which detects a temperature that changes depending on an operating condition of an internal combustion engine, said failure diagnosis method comprising the steps of:

a) calculating an operation duration parameter indicative of a duration of engine operation from a starting time to a stopping time of said engine;

b) measuring an engine stop period from said stopping time to a next starting of said engine;

c) storing a maximum temperature detected by said temperature sensor during a determination period containing an engine operating period within a preceding engine operation cycle and an after-start period from starting of said engine to the time a predetermined waiting time period has elapsed from the starting of said engine within a present engine operation cycle;

d) storing a minimum temperature detected by said temperature sensor during the determination period;

e) determining an execution condition which is satisfied when the operation duration parameter calculated in the preceding engine operation cycle is greater than or equal to a predetermined value;

f) determining that said temperature sensor fails, if the execution condition is satisfied and a temperature difference between the maximum temperature and the minimum temperature is less than a failure determination threshold value, when the starting of said engine in the preceding engine operation cycle was a cold start; and g) determining that said temperature sensor fails, if the execution condition is satisfied, the temperature difference between the maximum temperature and the minimum temperature is less than the failure determination threshold value, and an engine stop period in the preceding engine operation cycle is longer than a failure determination permission time period, when the starting of said engine in the preceding engine operation cycle was not a cold start.

9. A computer program according to claim 8, wherein the operation duration parameter is an integrated value of an amount of fuel supplied to said engine.

10. A computer program according to claim 8, wherein said temperature sensor is a cooling water temperature sensor for detecting a cooling water temperature of said engine.

* * * * *